United States Patent
Yagi

(10) Patent No.: US 7,227,153 B2
(45) Date of Patent: Jun. 5, 2007

(54) METHOD FOR MEASURING ULTRAVIOLET RADIATION AND ULTRAVIOLET MEASURING DEVICE

(75) Inventor: Shigeru Yagi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 25 days.

(21) Appl. No.: 11/002,648

(22) Filed: Dec. 3, 2004

(65) Prior Publication Data

US 2005/0236576 A1    Oct. 27, 2005

(30) Foreign Application Priority Data

Apr. 23, 2004  (JP)  ............................. 2004-128702

(51) Int. Cl.
*G01J 1/00*   (2006.01)

(52) U.S. Cl. .................... 250/372; 250/472.1

(58) Field of Classification Search ............. 250/472.1
See application file for complete search history.

(56) References Cited

U.S. PATENT DOCUMENTS

| | | | |
|---|---|---|---|
| 4,704,535 A | 11/1987 | Leber et al. ................. | 250/372 |
| 5,008,548 A | 4/1991 | Gat ............................ | 250/372 |
| 5,036,311 A * | 7/1991 | Moran et al. ................ | 340/600 |
| 5,186,630 A * | 2/1993 | Tien ........................... | 434/149 |
| 5,391,883 A * | 2/1995 | Kinsey et al. .............. | 250/372 |
| 5,576,551 A * | 11/1996 | Adair ........................ | 250/472.1 |

FOREIGN PATENT DOCUMENTS

| | | |
|---|---|---|
| EP | 1 120 636 A2 | 8/2001 |
| EP | 1 120 636 B1 | 9/2003 |
| JP | A-11-264760 | 9/1999 |
| WO | WO 97/43608 | 11/1997 |
| WO | WO 03/031921 A2 | 4/2003 |

OTHER PUBLICATIONS

"Forecast of Surface Ultraviolet Radiation," 1995-2006 Tsinghua Tongfang Oprical Disc Co., Ltd., pp. 28-42, Chinese text and partial translation.

* cited by examiner

*Primary Examiner*—David Porta
*Assistant Examiner*—Djura Malevic
(74) *Attorney, Agent, or Firm*—Morgan, Lewis & Bockius, LLP

(57) ABSTRACT

An ultraviolet measuring method using an ultraviolet sensitive element, comprising:
  measuring an ultraviolet intensity with the ultraviolet sensitive element at a sun altitude; and
  determining an integrated ultraviolet intensity within a specific ultraviolet wavelength range or a response index by converting the measured intensity to the integrated ultraviolet intensity within the specific ultraviolet range or the response index by using a conversion factor corresponding to the sun altitude,
wherein the conversion factor is a function of at least sun altitude.

An ultraviolet measuring method, using an ultraviolet sensitive element with spectral sensitivity to a specific wavelength range, comprising:
  measuring an ultraviolet intensity with the ultraviolet sensitive element; and
correcting the measured ultraviolet intensity according to sun altitude information for an arbitrary point in time so as to predict an ultraviolet intensity at the point in time.

26 Claims, 4 Drawing Sheets

METHOD FOR MEASURING ULTRAVIOLET RADIATION AND ULTRAVIOLET MEASURING DEVICE

CROSS-REFERENCE TO RELATED APPLICATION

This application claims priority under 35 USC 119 from Japanese patent Application No. 2004-128702, the disclosure of which is incorporated by reference herein.

BACKGROUND OF THE INVENTION

1. Field of the Invention

The present invention relates to an ultraviolet measuring method and an ultraviolet measuring device, which can easily measure ultraviolet rays in living environment and can get information on specific ultraviolet rays such as an amount of ultraviolet rays which have direct influences on human bodies.

2. Description of the Related Art

One of the biggest problems concerning the global environment has been an increase in the amount of ultraviolet radiation on the surface of the earth caused by destruction of ozone layer. Such ultraviolet rays cause health problems such as development of skin cancers, development of light-hypersensitivity, and light aging. Moreover, ultraviolet rays cause aesthetic problems such as pigmented spots and freckles.

Therefore, measurement of ultraviolet rays in our living environment has become more important from the viewpoint of beauty and health care.

However, a dedicated ultraviolet gauging device is required for measurement of an amount of ultraviolet rays. Since it is a bother to carry a dedicated UV (ultraviolet) measuring device, it has been not easy to measure ultraviolet rays.

The ultraviolet rays have various kinds of influences on living bodies. Accordingly, there are various ways of expressing an amount of ultraviolet rays, depending on the purpose for the measurement of ultraviolet rays. For example, an amount of ultraviolet rays may be represented by the total amount of ultraviolet rays (290 to 400 nm), by the amount of ultraviolet rays measured by an ultraviolet sensor having sensitivity only to the UVA range (320 to 400 nm), or by the amount of ultraviolet rays measured by an ultraviolet sensor having sensitivity only to the UVB range (290 to 320 nm).

SUMMARY OF THE INVENTION

However, the ultraviolet ray sensors do not have characteristic curves corresponding to, for example, an erythema curve determined by the capability of developing skin sunburn. The sensors are calibrated at representative wavelengths within their spectral sensitivity curve; therefore, the sensors do not have similar sensitivity distributions to delta functions within the defined wavelength range.

The index determined by the erythema curve is called "the UV index." The UV index represents the energy amount of ultraviolet rays per one hour around noon weighted by the erythema curve. Generally, the UV indexes are classified into over ten grades, but are also classified into five levels expressed by phrases corresponding to human feeling.

The UV index is obtained by weighting each wavelength in the UVA and UVB ranges by a corresponding value on the erythema curve. Accordingly, an accurate value has been obtained only from the spectral irradiance. In order to measure the spectral irradiance, it is necessary to use a large-sized measuring device, thus the measurement is not convenient. Further, an amount of the UVA cannot be measured by a spectral sensitivity measuring device adapted to such a measurement of ultraviolet rays which are capable of causing erythema. Therefore, ultraviolet rays through a window, which has large influences on aesthetic problems such as pigmented spots and freckles, can not be taken into consideration.

As described above, there has been no method for getting specific ultraviolet information easily, and an improved method has been required.

The present invention has been made, considering the above-described problems of conventional methods.

The ultraviolet measuring methods of the present invention utilize a fact that an wavelength distribution of intensity of ultraviolet light on the surface of the earth is strongly affected by absorption and scattering in the stratosphere, but is not significantly affected by the weather or the altitude of the observation point. Accordingly, the wavelength distribution of intensity of ultraviolet light on the surface of the earth is mainly affected by the sun altitude. Although the intensity of ultraviolet light on the surface of the earth is affected by the weather or the like, the wavelength distribution can be estimated if information on the sun altitude is obtained. This principle can be applied to calculate an entire intensity (In2) of ultraviolet light within a specific wavelength range, as described in the following.

Each ultraviolet sensitive element has a specific characteristic in terms of sensitivity. Here, an ultraviolet intensity actually measured by the ultraviolet sensitive element is represented by "Ma." If the sun altitude is the same, the ratio (Ra1) of "In2" to "Ma" is almost the same since the wavelength distribution is almost the same. If a conversion table is once made on which "Ra1" values for respective sun altitude are written, it is possible to obtain the value "Ma" by the ultraviolet sensitive element and to calculate "In2" from "Ma" by multiplying "Ma" by the conversion factor for the sun altitude on the conversion table. The sun altitude can be calculated or measured or inputted. The conversion table may be stored in a memory. However, the conversion table is not essential since the conversion factor can be calculated at the observation point.

The same technique can be applied to calculate an index (a response index) which is related to a specific influence on human body or the like. The UV index is an example of such an index. The response index (Ri) is obtained by multiplying an intensity at a wavelength by a corresponding value on a response curve and integrating the product along the wavelength axis. If the sun altitude is the same, the ratio (Ra2) of "Ri" to "Ma" is almost the same since the wavelength distribution is almost the same. If a conversion table is once made on which "Ra2" values for respective sun altitude are written, it is possible to obtain the value "Ma" by the ultraviolet sensitive element, to measure the sun altitude, and to calculate "Ri" from "Ma" by multiplying "Ma" by the conversion factor for the sun altitude on the conversion table. The sun altitude can be calculated or measured or inputted. The conversion table may be stored in a memory. However, the conversion table is not essential since the conversion factor can be calculated at the observation point.

In these techniques, it is not necessary for the conversion table to include conversion factors for every sun altitude. The techniques can be applied if the conversion table includes conversion factors for some practical sun altitudes.

The conversion factors may be determined experimentally or theoretically or by a combination of experiment and theory.

The ultraviolet sensitive element has not necessarily been calibrated to an integrated ultraviolet intensity within a specific wavelength range. However, when the ultraviolet intensity is changed while the wavelength distribution is fixed, the ultraviolet sensitive element has to accurately indicate the ratio of the intensity change. For example, if the ultraviolet intensity is doubled while the wavelength distribution is fixed, the intensity indicated by the ultraviolet sensitive element has to be doubled. Since the UVA occupies most of the solar ultraviolet rays, it is practically sufficient that the measured intensity has been so calibrated that the measured intensity corresponds to UVA intensity. This calibration may be conducted within the measuring device, or there may be provided a calibration table or the like so that the calibration is conducted outside of the measuring device.

A first aspect of the present invention is to provide an ultraviolet measuring method using an ultraviolet sensitive element, comprising:

measuring an ultraviolet intensity with the ultraviolet sensitive element at a sun altitude; and determining an integrated ultraviolet intensity within a specific ultraviolet wavelength range by converting the measured intensity to the integrated ultraviolet intensity within the specific ultraviolet range by using a conversion factor corresponding to the sun altitude, wherein the conversion factor is a function of at least sun altitude.

A function "F ($\theta$)=C" is excluded from the scope of the function, wherein $\theta$ represents the sun altitude and C represents a constant.

The conversion factor may correspond to a ratio of an integrated ultraviolet intensity within the specific ultraviolet range at the sun altitude to an intensity measured by the ultraviolet sensitive element at the sun altitude.

A second aspect of the present invention is to provide an ultraviolet measuring method using an ultraviolet sensitive element, comprising:

measuring an ultraviolet intensity with the ultraviolet sensitive element at a sun altitude; and determining a response index by converting the measured intensity to the response index by using a conversion factor corresponding to the sun altitude, wherein the conversion factor is a function of at least sun altitude.

A function "F ($\theta$)=C" is excluded from the scope of the function, wherein $\theta$ represents the sun altitude and C represents a constant.

The conversion factor may correspond to a ratio of a response index at the sun altitude to an intensity measured by the ultraviolet sensitive element at the sun altitude.

Each of the conversion factors can be considered as a product of two factors. One of the factors may be a factor which converts the measured intensity to a desired integrated intensity or a desired response index at a predetermined sun altitude. The other factor may be a factor which reflects the difference in wavelength distribution between a sun altitude and the predetermined sun altitude. The intensity indicated by the ultraviolet sensitive element can be calibrated so that the indicated intensity corresponds to an integrated ultraviolet intensity within a specific wavelength range. In the following aspects, the standard intensity ratio corresponds to the first factor and the sun altitude correction factor corresponds to the second factor.

A third aspect of the present invention is to provide an ultraviolet measuring method using an ultraviolet sensitive element having spectral sensitivity in a first ultraviolet wavelength range, comprising:

measuring an integrated ultraviolet intensity within the first ultraviolet wavelength range with the ultraviolet sensitive element at a sun altitude; and determining an integrated ultraviolet intensity within a second ultraviolet wavelength range by correcting the measured intensity on the basis of a standard intensity ratio and a sun altitude correction factor, wherein the standard intensity ratio is a ratio between an integrated ultraviolet intensity within the second ultraviolet wavelength range and an integrated ultraviolet intensity within the first ultraviolet wavelength range, with respect to a standard solar radiation spectrum.

The standard intensity ratio and the sun altitude correction factor each may have been obtained before the observation or may be calculated on the observation point.

A fourth aspect of the invention is to provide an ultraviolet measuring method using an ultraviolet sensitive element having spectral sensitivity in a first ultraviolet wavelength range, comprising:

measuring an integrated ultraviolet intensity within the first ultraviolet wavelength range with the ultraviolet sensitive element at a sun altitude; and determining a response index on the basis of the measured intensity, a standard intensity ratio, and a sun altitude correction factor, wherein the standard intensity ratio is a ratio between a response index and an integrated ultraviolet intensity within the first ultraviolet wavelength range, with respect to a standard solar radiation spectrum.

The standard intensity ratio and the sun altitude correction factor each may have been obtained before the observation or may be calculated on the observation point.

The response index with respect to the standard solar radiation spectrum may be determined from the standard solar radiation spectrum and a response curve. Specifically, the response index with respect to the standard solar radiation spectrum may be determined by integrating (intensity at a wavelength×corresponding value on a response curve) along the wavelength axis.

In the third and fourth aspects, a value measured by an ultraviolet sensitive element is multiplied by the standard intensity ratio and the sun altitude correction factor, thus corrected. The standard intensity ratio is obtained by dividing an integrated ultraviolet intensity of the standard solar radiation spectrum within a specific wavelength range by an integrated ultraviolet intensity of the standard solar radiation spectrum within the first ultraviolet wavelength range, wherein the standard solar radiation spectrum was measured separately. In the present invention, the integrated ultraviolet intensity of the standard solar radiation spectrum within a specific wavelength range refers to an integrated ultraviolet intensity of the standard solar radiation spectrum within the second ultraviolet wavelength range or a response index of the standard solar radiation spectrum determined by the standard solar radiation spectrum and by a specific response curve.

The third and fourth aspects can be modified to as follows:

An ultraviolet measuring method using an ultraviolet sensitive element with spectral sensitivity to a specific range, comprising:

correcting an actually measured value of solar ultraviolet intensity which is measured with the ultraviolet sensitive element on the basis of a standard intensity ratio and a sun altitude correction factor for the standard intensity ratio, to obtain an ultraviolet intensity within a second ultraviolet wavelength range or ultraviolet intensity related to a specific response curve, wherein the standard intensity ratio is a ratio between a first integrated ultraviolet intensity of a standard spectroscopic solar radiation spectrum within a first ultraviolet wavelength range and a second integrated ultraviolet intensity of the standard spectroscopic solar radiation spectrum within a second ultraviolet wavelength range or a third integrated ultraviolet intensity of the standard spectroscopic solar radiation spectrum obtained from the standard spectroscopic solar radiation and a specific response curve.

The ultraviolet intensity related to a specific response curve and the third integrated ultraviolet intensity may be considered as a response index.

According to the third and fourth aspects of the invention, with a simple constitution, it is possible to easily obtain specific ultraviolet information (ultraviolet intensity within a second ultraviolet wavelength range, or ultraviolet intensity related to a specific response curve) from actually measured values, regardless of the weather. It is also possible to determine the total amount of ultraviolet rays. Moreover, for example, ultraviolet intensities and amounts of ultraviolet rays of UVA and UVB can be determined separately from each other.

However, in order to obtain an absolute value of ultraviolet intensity and an amount of the ultraviolet rays, an actually measured value obtained by an ultraviolet sensitive element has to be calibrated so that the measured value indicates the ultraviolet irradiance within the defined wavelength range of the element. The calibration may be conducted by using a standard light source or the like.

Examples of the first ultraviolet wavelength range include the whole ultraviolet ray range (for example, a wavelength range of UVA+UVB, that is, 290 to 400 nm), a wavelength range of UVB (290 to 320 nm) or a wavelength range of UVA (320 to 400 nm).

The second ultraviolet wavelength range may be within the first ultraviolet wavelength range. For example, when the first ultraviolet wavelength range is the whole ultraviolet ray range of 290 to 400 nm, the second ultraviolet wavelength range may be the UVB wavelength range of 290 to 320 nm.

An example of the response curve is the erythema curve. When the erythema curve is applied and the first ultraviolet wavelength range is, for example, the whole ultraviolet range of 290 nm to 400 nm, the response index calculated from the solar spectrum and the specific response curve may be an erythema ultraviolet intensity within 290 to 400 nm. Furthermore, for example, when the first ultraviolet wavelength range is UVB of 290 to 320 nm, the response index may be an erythema ultraviolet intensity within 290 to 320 nm.

Thereby, an ultraviolet intensity which directly affects human body (or an UV index corresponding to the intensity) can be obtained. An arbitrary response curve which represents the influence of ultraviolet rays may be used as the response curve. For, example, the response curve may be a response curve of the influence on DNA.

The wavelength range of the spectral sensitivity of an ultraviolet sensitive element may or may not include the whole first ultraviolet wavelength range and the whole second ultraviolet wavelength range. For example, when the spectral sensitivity range of an ultraviolet sensitive element is 290 to 400 nm, the ultraviolet intensity of UVB of 290 to 320 nm can be obtained as the second ultraviolet wavelength range. When the spectral sensitivity range of an ultraviolet sensitive element is 320 to 400 nm, the ultraviolet intensity within the wavelength range of UVB of 290 to 320 nm, which is out of the spectral sensitivity range, may be determined as the second ultraviolet wavelength range. However, in this case, values actually measured by the ultraviolet sensitive element must have been corrected to ultraviolet intensity of UVB which occupies most of the solar ultraviolet radiation.

Preferably, the sun altitude correction factor for the above-described standard intensity ratio may be determined on the basis of the light path length of the sunlight within the earth's atmosphere. Furthermore, it is preferable to consider ozone concentration information in determining the sun altitude correction factor.

The sun altitude varies depending on the latitude and/or the longitude, and date and time. The attenuation amount of the sunlight upon transmission through the stratosphere and the troposphere varies depending on the light path length within the stratosphere and the troposphere. In addition, the transmission coefficient varies depending on the wavelength. Moreover, the attenuation amount upon transmission through the ozone layer varies depending on the light path length within the ozone layer and the ozone concentration of the ozone layer, in the case of UVB wavelength range or of an ultraviolet wavelength range related to the erythema curve. Accordingly, an accurate sun altitude correction factor can be obtained on the basis of the light path length of the sunlight within the earth atmosphere and ozone concentration information.

A fifth aspect of the invention is to provide an ultraviolet measuring device comprising an ultraviolet sensitive element and a conversion device, wherein the conversion device converts a value measured by the ultraviolet sensitive element at a sun altitude to an integrated ultraviolet intensity within a specific wavelength range by using information of the sun altitude.

A sixth aspect of the invention is to provide an ultraviolet measuring device comprising an ultraviolet sensitive element and a conversion device, wherein the conversion device converts a value measured by the ultraviolet sensitive element at a sun altitude to a response index by using information of the sun altitude.

The details of the conversion may be the same as in the description of the ultraviolet measuring methods.

A seventh aspect of the invention is to provide an ultraviolet measuring device comprising:

an ultraviolet sensitive element with spectral sensitivity to a first wavelength range;

a storage unit which stores a standard intensity ratio; and a correction unit which corrects an intensity measured by the ultraviolet sensitive element on the basis of the standard intensity ratio and a sun altitude correction factor to obtain an integrated ultraviolet intensity within a second ultraviolet wavelength range, wherein the standard intensity ratio is a ratio between an integrated ultraviolet intensity within the second ultraviolet wavelength range and an integrated ultraviolet intensity within the first ultraviolet wavelength range, with respect to a standard solar radiation spectrum.

A eighth aspect of the invention is to provide an ultraviolet measuring device comprising:

an ultraviolet sensitive element with spectral sensitivity to a first wavelength range;

a storage unit which stores a standard intensity ratio; and a correction unit which corrects an intensity measured by the ultraviolet sensitive element on the basis of the standard intensity ratio and a sun altitude correction factor to obtain a response index, wherein the standard intensity ratio is a ratio between a response index and an integrated ultraviolet intensity within the first ultraviolet wavelength range, with respect to a standard solar radiation spectrum.

The details of the standard intensity ratio, the response index, and the sun altitude correction factor may be the same as in the third and fourth aspects.

The seventh and eighth aspects of the invention can be modified as follows:

An ultraviolet measuring device comprising:

an ultraviolet sensitive element with spectral sensitivity to a specific wavelength range;

a storage unit which stores a standard intensity ratio, the standard intensity ratio being a ratio between a first integrated ultraviolet intensity of a standard spectroscopic solar radiation spectrum within a first ultraviolet wavelength range and a second integrated ultraviolet intensity of the standard spectroscopic solar radiation spectrum within a second ultraviolet wavelength range or a third integrated ultraviolet intensity obtained from the standard spectroscopic solar radiation spectrum and a response curve; and a correction unit which corrects an actually measured value of solar ultraviolet intensity measured with the ultraviolet sensitive element on the basis of the standard intensity ratio and a sun altitude correction factor for the standard intensity ratio to obtain an ultraviolet intensity within the second ultraviolet wavelength range or an ultraviolet intensity related to the response curve.

The ultraviolet intensity related to a specific response curve and the third integrated ultraviolet intensity may be considered as a response index.

According to the ultraviolet measuring device according to the aspects of the invention, specific ultraviolet information about ultraviolet rays within a specific range (the second ultraviolet wavelength range) and about a response curve can be easily obtained from a value measured by an ultraviolet sensitive element having specific spectral characteristics. Therefore, such specific ultraviolet information can be monitored conveniently and constantly. Further, the total amount of ultraviolet rays can also be obtained.

The ultraviolet measuring device may further comprise a sun altitude information acquisition unit which acquires the sun altitude information by which the conversion factor or the sun altitude correction factor for the standard intensity ratio is obtained. The ultraviolet measuring device may be provided with latitude information and/or longitude information, and with date and time information as the sun altitude information. Furthermore, for example, the erythema curve may be applied as the response curve as described above.

The conversion factor and the sun altitude correction factor for the standard intensity ratio can be determined on the basis of the light path length of the sunlight within the earth atmosphere and ozone concentration information as described above. The light path length and ozone concentration vary depending on the latitude and/or the longitude and on the date and time. An accurate ultraviolet intensity can be determined by acquiring such pieces of information as sun altitude information with the sun altitude information acquisition unit.

A ninth aspect of the invention is to provide an ultraviolet measuring method, using an ultraviolet sensitive element with spectral sensitivity to a specific wavelength range, comprising:

measuring an ultraviolet intensity with the ultraviolet sensitive element; and correcting the measured ultraviolet intensity according to sun altitude information for an arbitrary point in time so as to predict an ultraviolet intensity at the point in time.

The sun altitude varies depending on the latitude and/or the longitude, and date and time. The attenuation amount of the sunlight upon transmission through the stratosphere and the troposphere varies depending on the light path length. In addition, the transmission coefficient varies depending on the wavelength. Moreover, the attenuation amount upon transmission through the ozone layer varies depending on the light path length within the ozone layer and the ozone concentration of the ozone layer, in the case of UVB wavelength range or of an ultraviolet wavelength range related to the erythema curve.

The ultraviolet measuring method of the ninth aspect of the invention utilizes the fact that ultraviolet intensity at a point in time (which means "at a sun altitude") is influenced by the sun altitude. Therefore, in the method, the ultraviolet intensity at an arbitrary point in time is predicted by correcting the measured ultraviolet intensity according to the sun altitude information at the point in time. As a result, a specific ultraviolet information can be acquired or predicted according to the location and the date and time, regardless of the weather.

Furthermore, an integrated ultraviolet intensity over a period can be calculated according to the ultraviolet measuring method of the ninth aspect of the invention. And, an appropriate ultraviolet ray protective agent can be decided based on the predicted integrated amount of ultraviolet rays.

As described above, according to the method, an ultraviolet intensity at an arbitrary point in time can be predicted. By integrating the predicted ultraviolet intensity over a predetermined period, it is possible to predict an integrated ultraviolet intensity over the period in which an outing is scheduled. Based on the predicted integrated ultraviolet intensity, it is possible to select an ultraviolet ray protective agent suitable for the outing and to block ultraviolet rays effectively.

A tenth aspect of the invention is to provide an ultraviolet measuring device comprising:

an ultraviolet sensitive element having spectral sensitivity to a specific wavelength range;

a storage unit which stores sun altitude information for arbitrary points in time; and a correction unit which corrects an actually measured ultraviolet intensity according to sun altitude information for an arbitrary point in time so as to predict an ultraviolet intensity at the point in time.

By using the ultraviolet measuring device of the tenth aspect of the invention, it is possible to acquire or predict specific ultraviolet information according to the location and the date and time, regardless of the weather.

The ultraviolet measuring device may comprise a calculating unit which calculates an integrated ultraviolet intensity over a specified period, and a selection unit which select an ultraviolet ray protective agent based on the predicted integrated ultraviolet intensity. Effective ultraviolet ray protection can be realized by the above configuration.

DESCRIPTION OF THE PRESENT INVENTION

Figure 1:
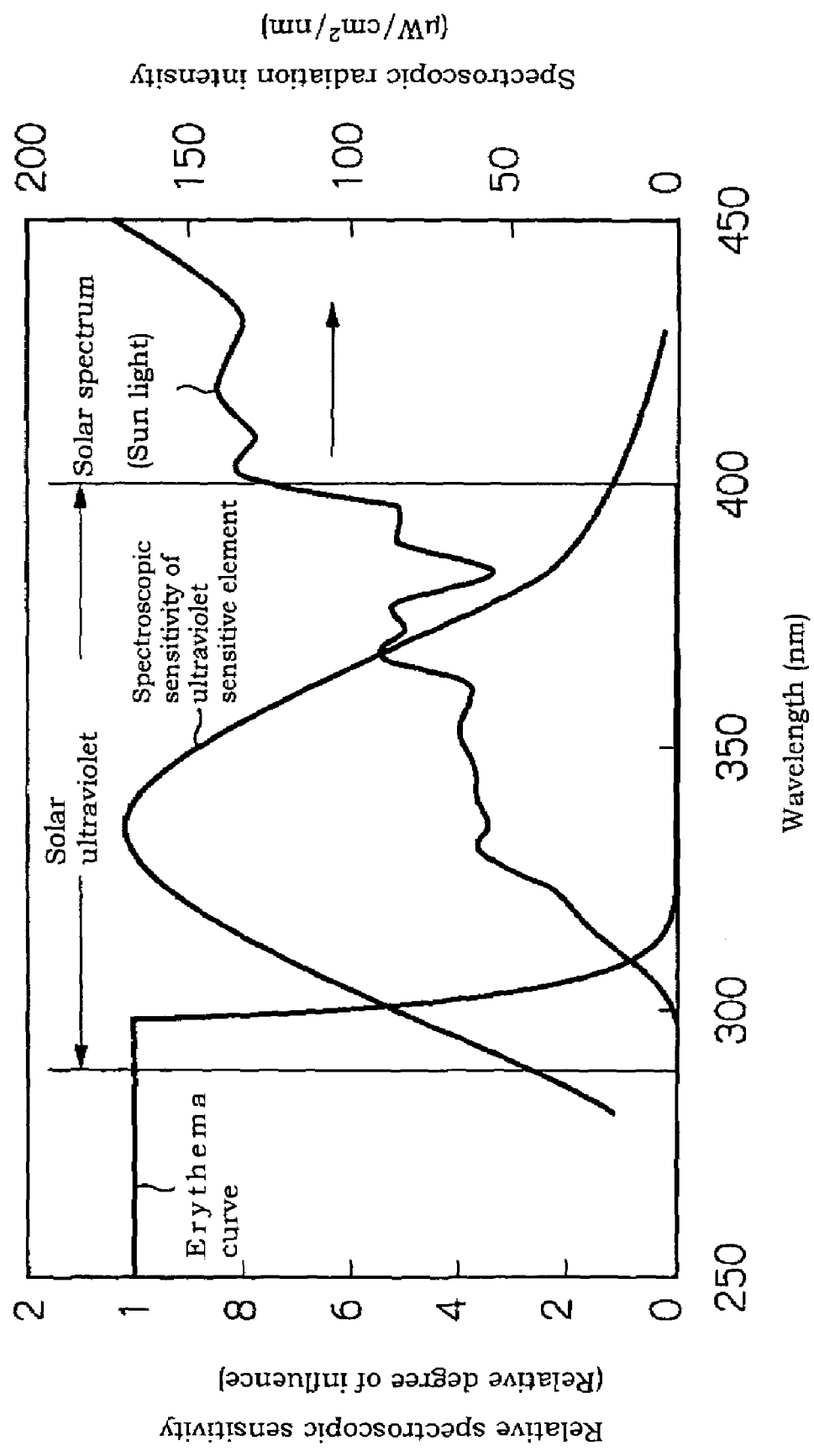
FIG. 1 is a relationship diagram showing the spectral sensitivity of an ultraviolet sensitive element, the spectrum of the sun, and the erythema curve.

Hereinafter, an ultraviolet measuring method according to the present invention will be explained in detail.

The ultraviolet rays having wavelengths not longer than 200 nm in the sunlight are absorbed by oxygen and do not reach the surface of the earth. Further, the ozone layer in the stratosphere absorbs the ultraviolet rays having wavelengths of 200 nm through 360 nm. Especially, the ultraviolet rays having wavelengths of 290 nm or less are particularly efficiently absorbed by ozone. Accordingly, ultraviolet rays (solar ultraviolet radiation) emitted by the sun and reaching the surface of the earth consists of rays having longer wavelengths than 290 nm. The ultraviolet rays having wavelengths of 290 to 320 nm are called UVB, and the ultraviolet rays having wavelengths of 320 to 400 nm are called UVA.

It is reported that the ratio between UVB and UVA in the solar ultraviolet radiation is almost constant under any weather conditions at the same time on the same day. The ratio varies depending mainly on the amount of UVB absorbed by the ozone layer of the stratosphere in the sky. Because the ultraviolet rays on the ground have a narrower wavelength range, it is thought that difference in scattering or reflection between the ultraviolet rays having different wavelengths can be neglected and the wavelength distribution is not strongly affected by the weather. Moreover, the ultraviolet is not influenced by the height of the observation point since even mountains are in the troposphere.

In an embodiment of the invention, an integrated ultraviolet intensity within a specific wavelength range can be determined on the basis of an intensity measured by a specific ultraviolet sensitive element and a conversion factor corresponding to the sun altitude. The conversion factor is a function of at least the sun altitude. However, since the thickness of ozone layer differs depending on the position on the earth, the conversion factor may be a function of the latitude and/or the longitude, in addition to the sun altitude. Further, the thickness of the ozone layer changes, the conversion factor may depend on ozone layer information. In another embodiment, a response index can be determined on the basis of an intensity measured by a specific ultraviolet sensitive element and a conversion factor corresponding to the sun altitude. The basic principle is the same as recited above. The term "response index" used herein refers to an index indicating an extent of effect caused by ultraviolet rays. For example, the effect may be, for example, an increase in possibility of development of skin cancer, development of pigment spots, development of erythema, or development of sunburn.

The conversion factor can be determined experimentally or theoretically or by a combination thereof. For example, the conversion factor can be determined by measuring the wavelength distribution by a spectrophotometer, or by measuring the intensity by a meter specific to a desired wavelength or desired response index such as a UVA meter and a UVB meter. The data about wavelength distribution disclosed in reference books or the like are also usable. It is also possible to calculate the conversion factor on the basis of factors such as the sun altitude, the latitude, the longitude, the ozone information, and the solar activity information. This calculation may be conducted automatically on the observation point. Therefore, it is not always necessary to determine conversion factors for respective sun altitudes before a measurement.

The term "an integrated ultraviolet intensity" used herein refers to an ultraviolet intensity integrated along the wavelength axis, unless specified otherwise. Similarly, the term "an integrated ultraviolet intensity within a wavelength range" refers to an ultraviolet intensity integrated over the wavelength range. Further, the term "light path length" used herein refers to a light path length along which the light passes through the ozone layer, unless specified otherwise. Accordingly, the light path length refers to a light path length only within the ozone layer, unless specified otherwise.

In an ultraviolet measuring method according to an embodiment of the invention, a calibrated value of sunlight intensity actually measured (in the troposphere) by an ultraviolet sensitive element with specific spectral sensitivities (for example, 200 to 400 nm) is corrected according to a standard intensity ratio and a sun altitude correction factor (a sun altitude correction factor for the standard intensity ratio), so that ultraviolet information within specific wavelength range is obtained. The standard intensity ratio is a ratio between an integrated ultraviolet intensity obtained from the spectrum of the sun and another integrated ultraviolet intensity within a specific wavelength range (a second integrated ultraviolet intensity in a second ultraviolet wavelength range of the spectroscopic solar radiation spectrum, or a third integrated ultraviolet intensity obtained from the solar ultraviolet radiation spectrum and a specific response curve). That is, when, for example, the integrated ultraviolet intensity within a specific range is the ultraviolet intensity (erythema ultraviolet intensity) which is obtained from the solar spectrum and the erythema curve, the erythema ultraviolet amount and the UV index can be obtained on the basis of the erythema ultraviolet intensity obtained from an actually measured value.

The UV index can be determined by: (1) converting the erythema ultraviolet intensity to the erythema ultraviolet amount per hour (mJ/cm$^2$), then (2) dividing the obtained value by 10.

In an ultraviolet measuring method according to another embodiment of the invention, an obtained ultraviolet intensity is corrected according to the sun altitude information for an arbitrary point in time, so that the ultraviolet intensity at the point in time is predicted. For example, in predicting ultraviolet intensity at an arbitrary point in time (at a second point in time) from the ultraviolet intensity measured at a certain point in time (at a first point in time), the ultraviolet intensities at the second point in time can be corrected with sun altitude information (solar ultraviolet information). The sun altitude information may include pieces of information about the relationship between the sun altitude and the ultraviolet intensity at the first and second points in time, a weather factor, and the sun altitude correction factor.

Hereinafter, a correction method is described in detail, by which an amount of specific ultraviolet rays (ultraviolet intensity within a specific wavelength range) UV($\lambda$) is obtained based on an actually measured value UV0 ($\alpha_1$) at a sun altitude $\alpha_1$ which has been so calibrated that UV0 ($\alpha_1$) corresponds to the total amount of solar ultraviolet radiation.

An integrated ultraviolet intensity UV1 ($\theta$) within a target specific range (a second integrated ultraviolet intensity of spectroscopic solar radiation spectrum within a second ultraviolet wavelength range, or a third integrated ultraviolet intensity obtained from the solar ultraviolet radiation spectrum and a specific response curve) at a standard sun altitude $\theta$ is obtained by the following formula (1):

$$UV1(\theta)=\Sigma F(\lambda)R(\lambda,\theta)\Delta\lambda \qquad \text{Formula (1)}$$

In the formula, F represents a weighting factor (for example, the erythema curve), and R($\lambda,\theta$) represents a spectroscopic radiation intensity at a standard sun altitude $\theta$. $\Delta\lambda$ represents the unit wavelength interval of the spectroscopic radiation spectrum.

Then, an integrated ultraviolet intensity UV2 (a first integrated ultraviolet intensity) within a predetermined ultraviolet wavelength range at the standard sun altitude $\theta$ obtained from the solar spectrum is represented, for example, by the following formula (2). The predetermined ultraviolet wavelength range may be, for example, wavelength range of 290 to 400 nm.

$$UV2(\theta)=\Sigma R(\lambda,\theta)\Delta\lambda \qquad \text{Formula (2)}$$

In the formula, R($\lambda,\theta$) represents a spectroscopic radiation intensity at the standard sun altitude $\theta$.

As recited above, UV0 is measured at the sun altitude $\alpha_1$. The integrated ultraviolet value UV1($\alpha_1$) within the target specific wavelength range at the sun altitude $\alpha_1$ can be calculated from a standard intensity ratio between UV1($\theta$) and UV2($\theta$) and the sun altitude correction factor P($\alpha_1$) for the standard intensity ratio, as expressed by the following formula (3).

$$UV1(\alpha_1)=UV0(\alpha_1)\times(UV1(\theta)/UV2(\theta))\times P(\alpha_1) \qquad \text{Formula (3)}$$

The erythema ultraviolet intensity G ($\alpha_1$) derived from the erythema curve E($\lambda$) can be represented by the following formula (4):

$$G(\alpha_1)=UV0(\alpha_1)\times(UV1(\theta)/UV2(\theta))\times P(\alpha_1) \qquad \text{Formula (4)}$$

In this case, UV1($\theta$) is calculated by the equation, UV1 ($\theta$)=$\Sigma$E($\lambda$) R($\lambda$, $\theta$) $\Delta\lambda$. UV1($\theta$) is a standard erythema ultraviolet intensity.

The sun altitude correction factor P($\alpha_1$) for the standard intensity ratio (UV1($\theta$)/UV2 ($\theta$)) can be obtained from the light path length and the transmission coefficient upon transmission of the sunlight through the air. The transmission coefficient is influenced by ozone absorption, thus dependent on the wavelength. The light path length, along which the sunlight passes through the air, can be calculated from the sun altitude.

That is, the sun altitude correction factor P($\alpha_1$) can be obtained from the attenuation rate which can be calculated from the light path length and the transmission coefficient, wherein the light path length is a function of the sun altitude. Hereinafter, the details of determination of the sun altitude correction factor P($\alpha_1$) is explained.

Sun Altitude and Light Path Length within an Ozone Layer

The light path length along which the sunlight passes through the ozone layer in the stratosphere is calculated from the sun altitude which depends on the date and diurnal motion.

Calculation of Sun Altitude

The sun altitude (zenith angle Z) is obtained by the following formula:

$$\cos Z=\cos D' \cos L'+\sin D' \sin L' \cos H \qquad \text{Formula (5)}$$

In the formula, L' represents the colatitude of the observation point (the complementary angle of latitude L); D' represents the polar distance angle (the complementary angle of the celestial declination D); and H represents the hour angle.

The polar distance angle D' is calculated by the following formula (6):

$$\cos D'=\sin 23.5° \sin \alpha_2 \qquad \text{Formula (6)}$$

$\alpha_2$ represents an angle between a line connecting the earth and the sun on the observation day and a line connecting the earth and the sun at the vernal equinox of the year. $\alpha_2$ can be expressed by $\alpha_2$=n360°/365.25 (n is a number of days that has elapsed since the equinox).

The hour angle H is obtained by the following formula (7):

$$H=\pm 360° \; t/24 \text{ hours} \qquad \text{Formula (7)}$$

Here, t represents hours that have elapsed since the meridian passage, wherein a negative sign indicates that the observation is conducted before the meridian passage. The time at the meridian passage can be calculated by correcting the local standard time of the area by the difference in longitude between the observation point and the standard longitude. In order to make the hour angle more accurate, the hour angle can be corrected according to the equation of time.

With regard to the way of getting the above-described information, the date and time can be acquired from a clock. If the observation points are limited to a local area, the latitude may have been inputted as the position information. Alternatively, the position information can be acquired at any time with a position measurement device utilizing information from artificial satellites.

Attenuation Amount According to Light Path Length

The absorption coefficient, which is a major factor in determining the attenuation rate of ultraviolet rays upon transmission through the air, can be obtained from measured solar radiation spectra at different sun altitudes. The ultraviolet from the sun is attenuated by absorption by ozone in the stratosphere, and absorbed, scattered, or reflected in the troposphere depending on the state of the atmosphere. Scattering (Mie scattering) by clouds is scarcely dependent on the wavelength, which is in contrast to scattering (Rayleigh scattering) by air molecules.

If attenuation coefficients for respective wavelengths region have been determined, not only an erythema ultraviolet amount, but also an amount of specific ultraviolet (specific ultraviolet information) can be estimated based on the relationship between the actually measured value and the sun altitude. One of the coefficients which determine the attenuation rate is the absorption coefficient upon absorption of ultraviolet by ozone. This absorption coefficient is significant only in the wavelength range of 320 nm or less. The other coefficient is scattering coefficient. The scattering coefficient is significant in the whole ultraviolet wavelength range.

Calculation of Sun Altitude Correction Factor P($\alpha_1$)

(Influence of the Sun Altitude on Ozone Absorption)

Calculation of the light path length: In the following, the sun altitude is represented by $\theta_0$ (elevation angle), the radius of the earth is represented by $r_0$ (6400 km), the height of the highest point of the ozone layer is represented by $r_2$, and the height of the lowest point of the ozone layer is represented by $r_1$. The light path length $x(\theta_0)$ in the ozone layer is represented by the following formula:

$$x(\theta_0) = -r_0 \sin(\theta_0) + \sqrt{[(r_0 \sin(\theta_0))^2 + (r_2^2 + 2r_2 r_0)]} - \{-r_0 \sin(\theta_0) + \sqrt{[(r_0 \sin(\theta_0))^2 + (r_1^2 + 2r_1 r_0)]}\} \quad \text{Formula (8)}$$

The light path length is considered as a function of the sun altitude. For example, under the following conditions $r_1 = 20$ km, and $r_2 = 40$ km, the light path length can be calculated as follows: $x(80°) = 20.3$ km, $x(30°) = 39.47$ km, $x(15°) = 72.75$ km, and $x(0°) = 210.3$ km.

Calculation of Attenuated Amount:

The amount "I" attenuated by absorption can generally be expressed by using the light path length as follows:

$$I = I_0 \exp(-kx(\theta_0)) \quad \text{Formula (9)}$$

In the formula, $I_0$ is the intensity of an incident UV, and k is an absorption coefficient, which can be considered as a function of the wavelength. However, k is considered to be a constant for the narrow wavelength region such as UV region except the absorption of UVB (and UVC) in the ozone layer.

In the following formulae, a transmittance of the whole UV through the stratosphere and troposphere is represented by $Tr(\theta_0)$, an absorption coefficient of ultraviolet in the UVB range in the ozone layer is represented by $kb(\lambda b)$ (it is assumed that the transmittance of the ultraviolet in the UVB range in the other layers than the ozone layer is equal to the transmittance of the whole UV, which is $Tr(\theta_0)$). The incident intensity of the whole UV entering the stratosphere is represented by $I_0(\theta_0)$ and the incident intensity of the whole UVB entering the stratosphere is represented by $Ib_0(\theta_0)$.

The attenuated $Ib(\theta_0)$ is expressed by the following formula (10):

$$Ib(\theta_0) = Ib_0 \exp(-kb(\lambda b)x(\theta_0)) \times Tr(\theta_0) \quad \text{Formula (10)}$$

The attenuated $I(\theta_0)$ is represented by the following formula (11):

$$I(\theta_0) = I_0 Tr(\theta_0) \quad \text{Formula (11)}$$

When the sun altitude is $\theta_0$ and the transmission distance is $x(\theta_0)$, the ratio of UVB to UV after the absorption is represented by the following formula (12):

$$Ib(\theta_0)/I(\theta_0) = (Ib_0/I_0)\exp(-kb(\lambda b)x(\theta_0)) \quad \text{Formula (12)}$$

The UVB/UV ratio differs according to the season. For example, at Tokyo, a ratio of UVB/UV around the meridian passage (80°) in the summer is 5.5%, and the ratio of UVB/UV at the meridian passage (30°) in the winter is 3%, wherein the ratios have been obtained from the spectroscopic irradiance of rays coming directly from the sun without scattering. However, as the sun altitude is low in the morning to reduce the amount of short wavelength ultraviolet, the ratio of UVB/UV is about 1% even in the summer. Since the UVB/UV ratio can be calculated, by using the ratio as of the observation time point, it is possible to estimate the UVB amount based on the amount of the whole ultraviolet. In the summer, since the variation in the concentration of the ozone layer is smaller than in spring, the concentration of the ozone layer can be considered almost constant.

Since the erythema ultraviolet has further shorter wavelength than that of UVB, the variation in the ratio of the erythema ultraviolet to the whole UV is more significant than the variation in the ratio of UVB to the whole UV. $(Ib_0/I_0)$ and $kb(\lambda b)$ can be obtained by comparing irradiances of spectroscopic solar radiation measured at different sun altitudes $\theta_0$ In an embodiment, spectroscopic ultraviolet radiation intensities $Ib(\theta_1)$ and $I(\theta_1)$ are measured at a highest sun altitude ($\theta_1$) around the summer solstice. Similarly, spectroscopic ultraviolet radiation intensities $Ib(\theta_2)$ and $I(\theta_2)$ are measured at a lowest sun altitude ($\theta_2$) around the winter solstice. From these values, ratios $Ib(\theta_1)/I(\theta_1)$ and $Ib(\theta_2)/I(\theta_2)$ are obtained. By comparing the ratios, $\alpha = (Ib_0/I_0)$ and $\beta = kb(\lambda b)$ with respect to the erythema ultraviolet or the UVB can be obtained. As a result, if the measured value $I(\alpha_1)$ is obtained with information on the sun altitude $\alpha_1$ (as $\theta_0$), it is possible to calculate the UVB or erythema ultraviolet intensity as follows:

$$Ib(\alpha_1) = I(\alpha_1)\alpha\exp(-\beta x(\alpha_1)) \quad \text{Formula (13)}$$

The above formula can be normalized by the standard sun altitude $\gamma$ (as $\theta$) to cause the following formula (14):

$$Ib(\alpha_1) = I(\alpha_1)(Ib(\gamma)/I(\gamma))\exp[-\beta(x(\alpha_1) - x(\gamma))] \quad \text{Formula (14)}$$

Accordingly, the sun altitude correction factor $P(\alpha_1)$ is represented by the following formula (15):

$$P(\alpha_1) = \exp[-\beta(x(\alpha_1) - x(\gamma))] \quad \text{Formula (15)}$$

Then, the above formulae are combined to form the following formula (16).

$$Ib(\alpha_1) = I(\alpha_1)(Ib(\gamma)/I(\gamma))P(\alpha_1) \quad \text{Formula (16)}$$

Based on these formulae, an ultraviolet intensity within the UVB region or an erythema ultraviolet intensity at the sun altitude $\alpha_1$ can be obtained by the following formula (17):

UVB intensity (at the sun altitude $\alpha_1$)=measured value (at the sun altitude $\alpha_1$)×standard intensity ratio×sun altitude correction factor  Formula (17)

Erythema ultraviolet intensity (at the sun altitude $\alpha_1$)=measured value (at the sun altitude $\alpha_1$)× standard intensity ratio×sun altitude correction factor  Formula (18)

As described above, an actually measured value $UV0(\alpha_1)$ at a sun altitude $\alpha_1$ is multiplied by a standard intensity ratio ($UV1(\gamma)/UV2(\gamma)$) at a standard sun altitude $\gamma$ (as $\theta$), and further multiplied by a sun altitude correction factor $P(\alpha_1)$ at the sun altitude $\alpha_1$ to obtain a UVB intensity at the sun altitude $\alpha_1$ or an erythema ultraviolet intensity at the sun altitude $\alpha_1$.

The intensity to be calculated may be an intensity within a specific ultraviolet wavelength range (for example, UVB) or an erythema ultraviolet intensity obtained from a specific response curve (for example, the erythema curve). Such intensities can be calculated by using respective standard ratios at the standard sun altitude $\gamma$ (as $\theta$) and respective sun altitude $\gamma$ (as $\theta$).

The UV index is represented by one tenth of the amount of erythema ultraviolet. The amount of erythema ultraviolet is an amount of ultraviolet per hour converted according to the erythema curve shown in FIG. 1, and is generally represented by the following formula (19):

Erythema ultraviolet amount=erythema curve×spectroscopic solar ultraviolet irradiance×3600 seconds  Formula (19)

In other words, the following formula is satisfied.

(Erythema ultraviolet amount)/10=UV index  Formula (20)

Standard intensity ratio, $Ib(\gamma)/I(\gamma)$ can be represented by the following formula.

$$Ib(\gamma)/I(\gamma) = UV\ index \times 10/\text{the whole ultraviolet intensity}/3600\ \text{seconds} \quad \text{Formula (21)}$$

Accordingly, the UV index can be expressed by the following formula.

$$UV\ index = \text{Actually measured intensity } UV0(\mu W/cm^2) \times (UV\ index/\text{the whole ultraviolet amount, at a standard sun altitude}) \times \text{Sun altitude correction factor} \quad \text{Formula (22)}$$

Thereby, the erythema ultraviolet amount can be calculated from the actually measured value of solar ultraviolet radiation (total amount of ultraviolet) on the basis of the standard intensity ratio and the sun altitude correction factor, which are obtained from the positional information about the observation point (latitude information and longitude information) and the date and time information. The UV index can be obtained in the same way.

When the sun altitude correction factor $P(\alpha_1)$ is determined, ozone concentration information can be considered. In other words, the sun altitude correction factor $P(\alpha_1)$ can be modified according to changes in the ozone concentration. The modification may be conducted by modifying the absorption coefficient.

If the standard intensity ratio is measured at an ozone concentration Oz1 and observation is conducted at an ozone concentration of Oz2, the transmittance can be corrected according to a correction factor:−exp (−standard absorption coefficient×Oz2/Oz1×light path length in the ozone layer). This is because the absorption can be expressed by "the absorption coefficient×the concentration." The National Aeronautics and Space Administration (NASA) provides daily data on the ozone concentration, which is measured by artificial satellites, (TOMS: Total Ozone Mapping System). The data supplied by NASA can be used in the invention. Daily measured values may be used or a mean of values over several months or six months, which takes seasonal variations into consideration, may be used as the data on the ozone concentration.

Hereinafter, details are explained about the prediction of ultraviolet information for an arbitrary point in time on the basis of an obtained ultraviolet intensity. The prediction method includes converting the measured ultraviolet intensity according to solar altitude information for the point in time. The obtained ultraviolet intensity may be a specific ultraviolet intensity obtained by the above-described conversions, corrections, or modifications. Alternatively, the obtained ultraviolet intensity may have been obtained in another way.

In the first place, an almost linear relationship is established between the sun altitude (elevation angle) and the ultraviolet intensity in clear weather and clear atmosphere (for example, S. Yagi, PhotoMed. Photobiol. vol 25 p 55 (2003)). Based on the relationship, regardless of the season, the ultraviolet intensity in clear weather can be predicted from the sun altitude, which is determined by the latitude, the longitude, and the date and the time. The above prediction is conducted in clear weather. Regarding a prediction in a kind of weather other than clear weather, the prediction is possible in a manner recited below. A weather coefficient is determined by actual measurement. Specifically, the weather coefficient is obtained by dividing the intensity measured in a kind of weather at a sun altitude by an intensity predicted for the sun altitude based on the above relationship. It is possible to predict the ultraviolet intensity in the kind of weather at an arbitrary point in time by predicting an ultraviolet intensity at the arbitrary point in time on the basis of the above relationship and multiplying the predicted ultraviolet intensity by the weather coefficient.

It is also possible to predict an erythema ultraviolet amount and a UV index within an arbitrary period of time from an ultraviolet intensity (erythema ultraviolet intensity) obtained at a point in time, utilizing the above method.

Hereinafter, an example is specifically explained. In the example, an erythema ultraviolet intensity is obtained from an actually measured value, then an erythema ultraviolet amount E is acquired on the basis of the obtained erythema ultraviolet intensity to obtain a UV index.

Here, solar ultraviolet radiation is measured by an ultraviolet measuring device which utilizes an ultraviolet sensor (an ultraviolet sensor mounted on UV CAREMATE manufactured by Fuji Xerox Co., Ltd.) comprising a polycrystalline gallium nitride semiconductor, so that UV0 is obtained from the actual measurement. The ultraviolet measuring device is adjusted in such a way that an actually measured value is identical with a total amount of ultraviolet of 290 to 400 nm emitted from a standard light source. The sensitivity range of the device is 280 to 410 nm in this case. However, a device having a sensitivity range of, for example, 330 to 400 nm can be used for measuring the ultraviolet intensity within the wavelength range of 290 nm through 400 nm.

In order to obtain UVB from an actually measured value, the amount of UVB is obtained in the first place.

In the following, the horizontal data measured by the Electrotechnical Laboratory (currently National Institute of Advanced Industrial Science and Technology) at Tanashi-shi, Tokyo, Japan is used and a spectral measured value at a sun altitude (elevation angle) of 77° is assumed to be a standard sunlight ultraviolet ray.

Approximately at the summer solstice (77°, on Jun. 23, 1979), UVB within a range of 290 to 320 nm is represented by the following formula (23):

$$Ib(77)/I(77) = 0.0132 = (Ib_0/I_0)\exp(-kb(\lambda b)x(77)) \quad \text{Formula (23)}$$

Thus, a standard ratio (standard intensity ratio) of UVB to the total amount of ultraviolet at the sun altitude of 77° is 0.0132.

In order to obtain the UV index from the actually measured value, the erythema ultraviolet amount E is corrected according to sun altitude information. Here, the sun altitude correction factor for the standard intensity ratio of (the erythema ultraviolet intensity/whole UV) is obtained from the atmospheric transmission coefficient and the light path length according to the sun altitude.

In the following, the horizontal data of the Electrotechnical Laboratory at Tanashi-shi, Tokyo, Japan is used. The irradiance within the full range of 290 to 400 nm is used as the UV intensity.

Around the summer solstice (77°, on Jun. 23, 1979), the following formula is satisfied.

$$Ib(77)/I(77) = 0.0050 = (Ib_0/I_0)\exp(-kb(\lambda b)x(77)) \quad \text{Formula (24)}$$

Thus, a standard erythema ultraviolet ratio (standard intensity ratio) at the sun altitude of 77° to the total amount of ultraviolet is 0.005.

Around the winter solstice (31°, on Dec. 22, 1979), the following formula (22') is satisfied.

$$Ib(31)/I(31) = 0.0023 = (Ib_0/I_0)\exp(-kb(\lambda b)x(31)) \quad \text{Formula (22')}$$

Therefore, a mean absorption coefficient $kb(\lambda b)$ of the erythema ultraviolet range in the ozone layer is given by the following formula (25):

$$-kb(\lambda b) = \ln(0.0050/0.0023)/(x(77) - x(31)) \quad \text{Formula (25)}$$
$$= -0.0434/\text{km}$$

Moreover, $Ib_0/I_0$ is given by the following formula (26):

$$Ib_0/I_0 = 0.0050/\exp(-kb(\lambda b)x(77)) = 0.0122 \quad \text{Formula (26)}$$

As a result, a ratio C between the erythema ultraviolet and UV at an arbitrary sun altitude $\theta_0$ is represented as a function of the transmission distance $x(\theta_0)$ by the following formula (27):

$$C = Ib(\theta_0)/I(\theta_0) = (0.0122)\exp(-0.0434 \times x(\theta_0)) \quad \text{Formula (27)}$$

The ratio of the UVB to the whole UV can be obtained by a similar method.

Then, the light path length in the ozone layer according to the sun altitude is calculated to obtain sun altitude dependency of the ratio between the erythema ultraviolet and UV. The following values are used in the calculation: 6400 km as the radius $r_0$ of the earth, 40 km as the height $r_2$ of the upper limit of the ozone layer, 20 km as the height $r_1$, of the lower limit of the ozone layer. $\theta_0$ represents the sun altitude (elevation angle). As the standard ratio, used is the ratio between the amount of the erythema ultraviolet and the total amount of ultraviolet obtained from the integrated ultraviolet intensity of the above-described standard solar radiation spectrum (the meridian passage altitude of 77° according to the horizontal data at Tanashi-shi, Tokyo, Japan). The light path length, for example at the sun altitude of 30°, is 40 km. Accordingly, the sun altitude correction factor C is 0.44. Moreover, the sun altitude correction factor C is 0.78 at the sun altitude of 50°, corresponding to a light path length in the ozone layer of 26 km.

Accordingly, for example, an erythema ultraviolet intensity at the sun altitude of 30° on the same observation day is obtained by the following formula (18'):

Erythema ultraviolet intensity (30°)=Actually measured value $UV0$ (30°)×0.005×0.44     Formula (26')

Therefore, an erythema violet intensity can be expressed by the following formula.

Erythema ultraviolet amount (mJ/cm$^2$)=Actually measured value $UV0$ (30°)($\mu$W/cm$^2$)×1/1000× 0.005×3600s×0.44     Formula (28)

As the UV index is one tenth of the erythema ultraviolet amount, if the actually measured value $UV0(\alpha_1)$ is, for example, 5000 $\mu$W/cm$^2$, the UV index is 9 in the case of a sun altitude of 78° ($=\alpha_1$), and the UV index is 4 in the case of a sun altitude of 30°. Accordingly, if the location and the date and time are given, the amount of erythema ultraviolet and a UV index can be obtained from a measured UV value.

The formulae (18') and (28) can be considered as expressing a conversion factor. Accordingly, this embodiment may also be considered as an embodiment of the ultraviolet measuring method which uses a conversion factor.

The margin of error of these relationships expressed by the formulae is within ±20%, regardless of the weather. Moreover, UVB and UVA can be separately obtainable from the actually measured value of the total amount of ultraviolet according to the above-described method. UVB can be obtained in the same manner as in the case of the erythema ultraviolet. Specifically, the atmospheric transmission coefficient is obtained on the basis of comparison of the ratio between the UVB and the total amount of UV at a standard sun altitude and the ratio between the UVB and the total amount of UV at another sun altitude. UVA can be calculated by the following relationship:

UVA=Actually measured UV amount−UVB.

Subsequently, an example is described in which an erythema ultraviolet intensity at an arbitrary point in time is obtained from an obtained erythema ultraviolet intensity through a correction by sun altitude information for the arbitrary point in time.

As an example, assuming that the measured value of ultraviolet intensity at a sun altitude of 30° on a fine day in summer is 2500 $\mu$W/cm$^2$, and that an estimated ultraviolet intensity at that time is 3000 $\mu$W/cm$^2$, the weather coefficient can be 2500/3000. It is also assumed that an erythema ultraviolet intensity after the sun altitude correction is 5 $\mu$W/cm$^2$ at the sun altitude. If an estimated intensity at several hours later at a sun altitude of 60° is 6000 $\mu$W/cm$^2$ and an erythema ultraviolet intensity at that time predicted based on the estimated intensity is 24 $\mu$W/cm$^2$, the estimated erythema ultraviolet intensity of 24 $\mu$W/cm$^2$ is multiplied by the weather coefficient (2500/3000) to obtain a predicted erythema ultraviolet intensity (20 $\mu$W/cm$^2$) at a sun altitude of 60° on the same day. Moreover, an approximate weather coefficient can be obtained from the weather forecast.

Furthermore, an integrated erythema ultraviolet intensity within an arbitrary period can be obtained by integrating the obtained erythema ultraviolet intensity over the period.

Moreover, it is possible to suggest the kind of ultraviolet protective agent (sunscreen cosmetics) which provides a suitable protection against UV, based on the amount of erythema ultraviolet and the integrated erythema ultraviolet intensity obtained as described above. For example, the time required for the skin to be reddened by UV can be calculated based on the Minimum Erythema Dose (MED), and a Sun Protection Factor (SPF value) or Protection Grade of UVA (PA) of the ultraviolet protecting agent adequate for required UV protection level can be determined. Accordingly, for example, a suitable ultraviolet protecting agent can be selected before leaving home, based on ultraviolet information obtained from the schedule of the day. In this way, efficient UV protection can be realized.

Here, the SPF value and the PA value are obtained from the amount of erythema ultraviolet and the integrated erythema ultraviolet intensity, for example, in the following way.

The SPF value indicates the level of the erythema ultraviolet protection. First, an erythema ultraviolet intensity integrated over a scheduled period is obtained in the above-explained manner. A sun-screen agent can be determined which reduces the erythema ultraviolet dose to not more than the Minimum Erythema Dose (MED: an ultraviolet amount just sufficient for reddening the skin) of the person. For example, if the scheduled outdoor period is four hours and an erythema ultraviolet amount over the scheduled period is 400 mJ/cm$^2$ (a UV index of 10 is assumed to be maintained for four hours) and the person (whose skin is easily reddened) has a MED of 10 mJ/cm$^2$, then SPF40 can be selected. This is because the protection has to attenuate the erythema ultraviolet at a rate of 1/40.

Similarly, regarding PA, a required protection against a UVA intensity over a specified period is expressed in three levels. If a UVA intensity of 7500 $\mu$W/cm$^2$ is considered a maximum degree of 10, the PA+ level corresponds to degrees 2 to 3 which indicates a UVA intensity of 1000 to 2500 μW/cm², the PA++ level corresponds to degrees 4 to 7 which indicates a UVA intensity of 2500 to 5500 μW/cm², and PA+++ level corresponds to degrees 8 to 10 which indicates a UVA intensity of 5500 μW/cm² or larger. A predicted value of the UVA is obtained by subtracting an UVB intensity from the whole ultraviolet intensity, wherein the UVB intensity is obtained from the standard intensity ratio between the UVB and the whole ultraviolet and the sun altitude correction factor in the same manner as in the case of the erythema ultraviolet amount. As a simpler method, the amount of the whole ultraviolet may be used as the UVA amount. For example, it is proposed to use a sunscreen with the PA++ level when the predicted UVA intensity is 4000 μW/cm².

Hereinafter, the ultraviolet measuring device according to an embodiment of the invention will be explained in more detail, with reference to figures. Components having a substantially similar function shown in more than one figure is indicated by the same reference number in the figures. The explanation of the same component with the same reference number as an already-explained component is occasionally omitted.

Figure 2:
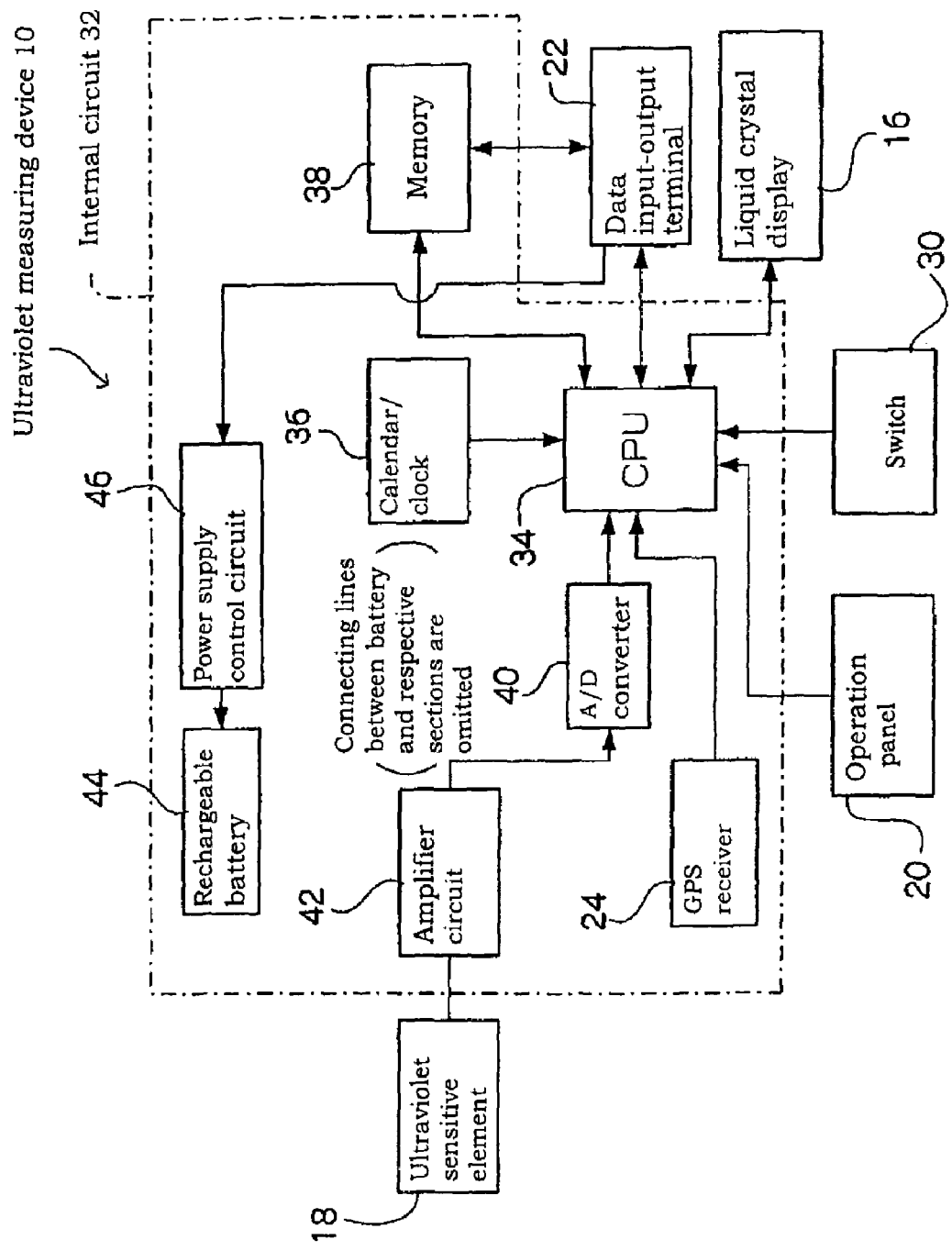
FIG. 2 is a schematic constitutional diagram showing a constitution of an ultraviolet measuring device according to an embodiment of the present invention.

FIG. 2 is a schematic constitutional diagram showing a constitution of an ultraviolet measuring device according to an embodiment of the present invention.

The ultraviolet measuring device 10 according to the embodiment comprises: a liquid crystal display 16 (display device) which displays various kinds of information; an ultraviolet sensitive element 18 which detects ultraviolet information in a form of a physical quantity of the ultraviolet; an operation panel 20 (operation device: for example, a power supply switch, a mode change switch, and a set switch) to which various kinds of information is inputted by the user of the ultraviolet measuring device 10; and an input-output terminal 22 through which the ultraviolet information indicating the ultraviolet intensity measured by the ultraviolet measuring device 10 is outputted and through which various kinds of information is inputted from an information terminal (not shown).

The ultraviolet sensitive element 18 may be an ultraviolet sensitive element produced by attaching a visible-ray-cut filter to a photodiode having a sensitivity in visible-ray range such as a photodiode comprising GaP or Si having a sensitivity in visible-ray range. Alternatively, the ultraviolet sensitive element 18 may be an ultraviolet sensitive element comprising an oxide semiconductor such as titanium oxide or zinc oxide. Especially, the ultraviolet sensitive element 18 may particularly preferably an ultraviolet sensitive element comprising a nitride-based compound semiconductor, which has a fast optical response, an absorption range adjustable by changing the composition, and excellent design properties in terms of size, color, and the like. Such an ultraviolet sensitive element does not require much space in a display section and the element can be compact and thin.

In the embodiment, a proportion of scattered solar ultraviolet in the ultraviolet radiation to be detected is significant. Therefore, However, the incidence angle characteristics of the ultraviolet sensitive element 18 preferably meet the Lambert's cosine law. The scattering coefficient is represented according to the law of Rayleigh. In other words, the scattering coefficient is expressed by the following formula. Scattering coefficient=a constant/(wavelength)$^4$. The scattering coefficient for a wavelength of 300 nm is 1.7 times the scattering coefficient for a wavelength of 340 nm under fine weather. The scattering coefficients for those wavelengths are five to eight times the scattering coefficient for a wavelength of 500 nm. Therefore, the scattering effect is significant in the case of ultraviolet rays having a short wavelength. Moreover, the displayed figures is a figure so corrected as to indicate an integrated ultraviolet amount of the spectroscopic solar radiation spectrum.

In the embodiment, a display module with a trade name: SEK1054B, manufactured by Seiko Epson Corporation is used as the liquid crystal display 16. The display module is a dot-matrix-type liquid crystal display module, and has a display surface of 96×32 dots, on which arbitrary information such as characters and graphs can be displayed. For example, on the spot after a measurement, a simple graph can be displayed on the display, and irradiance distribution and the like can be so displayed without outputting the data to the external input-output device (not shown) that the distribution and the like can be grasped intuitively. Not only the above-described display, but also all other displays such as other types of liquid crystal display, organic electroluminescent (EL) displays, plasma displays, and CRT displays can be used as the display 16.

The ultraviolet measuring device 10 comprises an internal circuit 32. The internal circuit 32 comprises: a central processing unit (CPU) 34 (CPU: a correction device) which controls all the operations of the ultraviolet measuring device 10; a memory 38 (storage device) which store various information; an analog/digital converter 40 (Hereafter, called "A/D converter") which converts inputted analog signals into digital data for output; an amplifier circuit 42 which amplifies an inputted analog signal; a rechargeable battery 44 which supplies driving electric power to sections in the internal circuit 32; and a power supply control circuit 46 which controls the voltage and the like of the current supplied to the rechargeable battery 44 when the battery 44 is recharged. In FIG. 2, connecting lines representing electric power supply lines from the rechargeable battery 44 to the sections in the circuit 32 are not shown for the sake of simplicity of the figure.

The internal circuit 32 comprises, as a sun altitude information acquisition unit, a Global Positioning System (GPS) receiver 24 which acquires position information; and a calendar/clock 36 which provides information about the date and time.

The GPS receiver 24 is connected to the CPU 34. The GPS receiver 24 comprise an antenna (not shown) which receives the electric waves from plural satellites (generally four satellites) orbiting the earth. The time required for the electric waves to travel the distance between a satellite and the antenna is used for calculating the distance between the satellite and the antenna. In this way, the distance between the antenna and each satellite is determined so that the position information (in the embodiment, one-dimensional information of latitude and longitude) is obtained. Thereby, the CPU 34 can acquire the position information at any time.

The calendar/clock 36, which provides information on the date and time, is connected to the CPU 34. The CPU 34 can acquire the date and time information (month, day, and time) from the calendar/clock 36 at any time. The calendar/clock 36 may be included in the CPU 34, and the time information can be acquired by using software.

Moreover, the memory 38 is connected to the CPU 34 which can store and read various kinds of information in the memory 38. Furthermore, the liquid crystal display 16 is connected to the CPU 34 which can order the display 16 to display various kinds of information. The switches in the operation panel 20 are also connected to the CPU 34 which can detect at any time whether the switches are pressed by the user.

The sensor output terminal of the ultraviolet sensitive element 18 is connected to the input terminal of the A/D converter 40 through the amplifier circuit 42. The output terminal of the converter 40 is connected to the CPU 34.

Moreover, the data input-output terminal 22 is connected to the CPU 34, wherein the CPU 34 can input and output various kinds of information through the data input-output terminal 22. Here, the data input-output terminal 22 is connected not only to the CPU 34, but also directly to the memory 38. Thereby, the ultraviolet measuring device 10 has a configuration in which various kinds of information can be written into the memory 38 directly from the outside through the data input-output terminal 22, and can be retrieved to the outside directly from the memory 38. Moreover, the data input-output terminal 22 is also connected to the rechargeable battery 44 through the power supply control circuit 46. In the ultraviolet measuring device 10, the voltage and the like are controlled by the power supply control circuit 46, and the circuit 46 recharges the rechargeable battery 44 in accordance with signals from the data input-output terminal 22.

In the ultraviolet measuring device 10, the CPU 34 is required to operate stably at any time. Therefore, in order to drive the CPU 34 with the rechargeable battery 44 as in the embodiment, the CPU 34 has to be capable of operating at a low electric power consumption and to have enough processing performance. In accordance with the necessity, a CPU with a trade name "H8/3827R" manufactured by Hitachi Semiconductor is used as the CPU 34 in this embodiment. The H8/3827R has a built-in calculation program, a built-in volatile memory for primary storage, and a built-in analog/digital converter circuit (corresponding to the A/D converter 40 in FIG. 2). Therefore, the number of components can be reduced to realize a low-cost and small-sized device.

Moreover, the memory 38 may be, for example, a storage element with a trade name "24LC256" manufactured by Microchip Technology Inc., US. This storage element has a large capacity in spite of its compactness, so that the size of the ultraviolet measuring device 10 can be reduced.

The storage content of the memory 38 in the ultraviolet measuring device 10 is explained in the following.

The memory 38 comprises: a header section which stores various kinds of information on measurement data (ultraviolet intensities); a measured data section which stores actually measured data; a program data section which stores calculation programs; and a set-value section which stores various kinds of set values. The program data section and the set value section store various kinds of calculation programs based on the above-described formulae which correct actually measured values, and various kinds of set values. Examples of the set values include sun altitude information, sun altitude correction factors, standard solar ultraviolet intensities, UV indices, local ozone concentration information, and kinds of ultraviolet protective agents corresponding to PFA values and PA values. Examples of the programs include programs by which ultraviolet intensities within specific ultraviolet wavelength ranges (for example, erythema ultraviolet intensities) are obtained, programs by which amounts of erythema ultraviolet are obtained, and programs by which UV indices are obtained. Examples of the formulae used in the programs include the formulae (17), (18), (20), and (22).

In the embodiment, in order to prevent leakage of the measured data to the outside, the measured data is stored in the measured data section after encoded according to a predetermined encoding method. Information and the like which indicate the above encoding method are stored in the above-described header section. The encoding method is not limited to a specific one, but various kinds of encoding technologies can be appropriately selected as the method.

Figure 3:
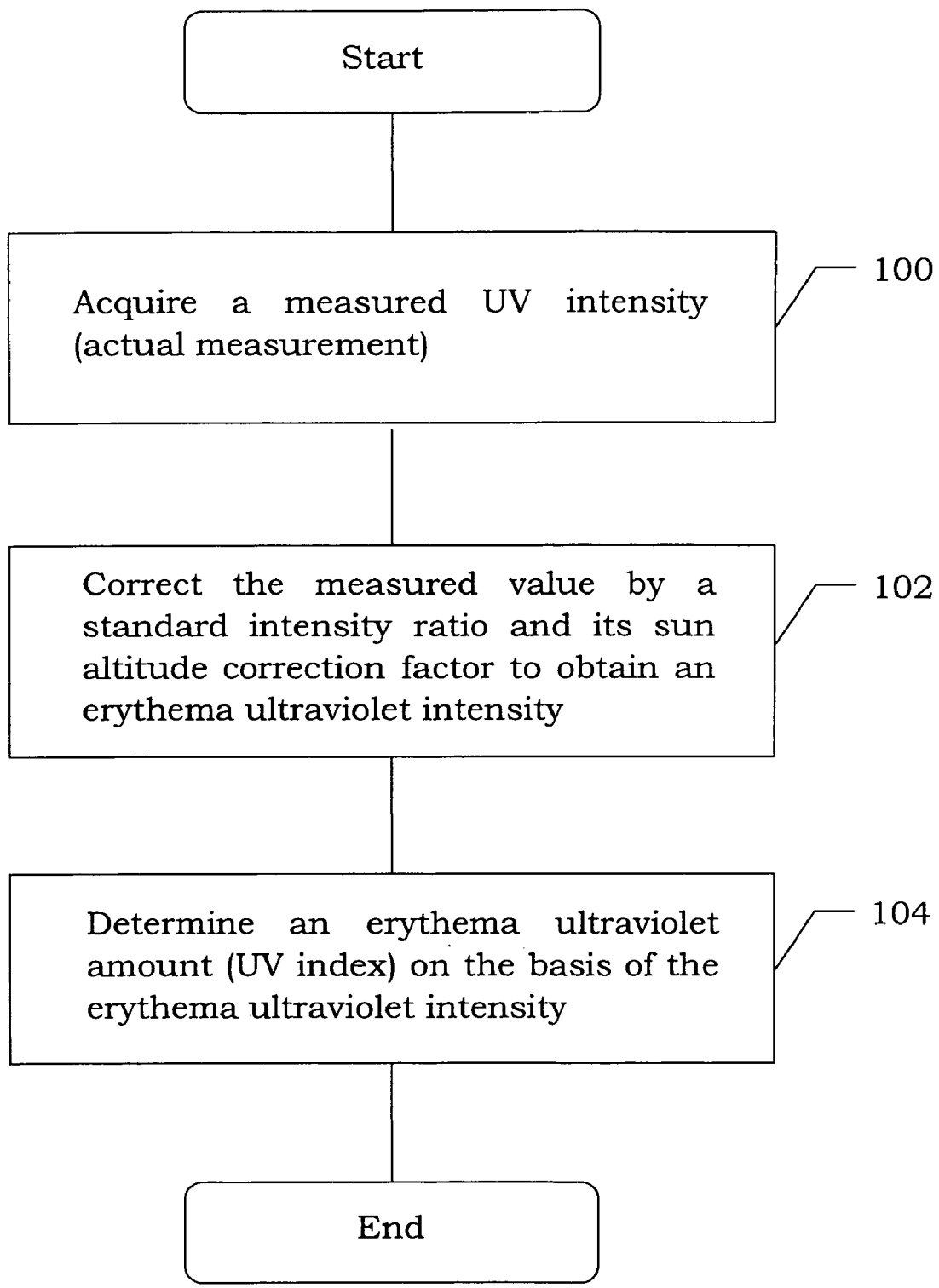
FIG. 3 is a flow chart showing a flow of ultraviolet measurement process in an ultraviolet measuring device according to an embodiment of the invention.

Subsequently, the operations of ultraviolet measuring steps in the ultraviolet measuring device 10 are explained in the following, referring to FIGS. 3 and 4. Here, FIG. 3 is a flow chart showing the operation at the ultraviolet measuring steps executed in the CPU 34. That is, the correction unit, calculating unit, and deciding unit correspond to the CPU 34.

In the following, as an example, described are the ultraviolet measuring process comprising determining an erythema ultraviolet intensity from an actually measured value and obtaining the erythema ultraviolet amount and UV index from the erythema ultraviolet intensity. However, the ultraviolet intensity of a specific wavelength range is not limited to the erythema ultraviolet intensity, and may be, for example, the ultraviolet intensity within the UVB range.

At a Step 100 in FIG. 3, ultraviolet is measured with the ultraviolet sensitive element 18 so as to acquire an actually measured ultraviolet amount (measured UV value), and the acquired information (the actually measured value) is stored in an unused storage area of the data section in the memory 38. Then, the process proceeds to a Step 102.

At the Step 102, position information (latitude information) is acquired from the GPS receiver 24; date and time information (month, day, and time) is acquired from the calendar/clock 36; the information (actually measured value UV0) acquired in the Step 100 and set values to be used in determining the erythema ultraviolet intensity are retrieved from the memory 38; the actually measured value is corrected according to the standard intensity ratio and the sun altitude correction factor for the erythema ultraviolet intensity; and the acquired information is stored in an unused storage area of the measured data section in the memory 38. Then, the process proceeds to a Step 104.

At the Step 104, the information (erythema ultraviolet intensity) acquired in Step 102 and set values to be used in obtaining the erythema ultraviolet amount and the UV index from the information acquired at the Step 102 are retrieved from the memory 38; the erythema ultraviolet amount and the UV index are obtained; and the acquired information is stored in an unused storage area of the measured data section in the memory 38. Then, the process is completed.

Figure 4:
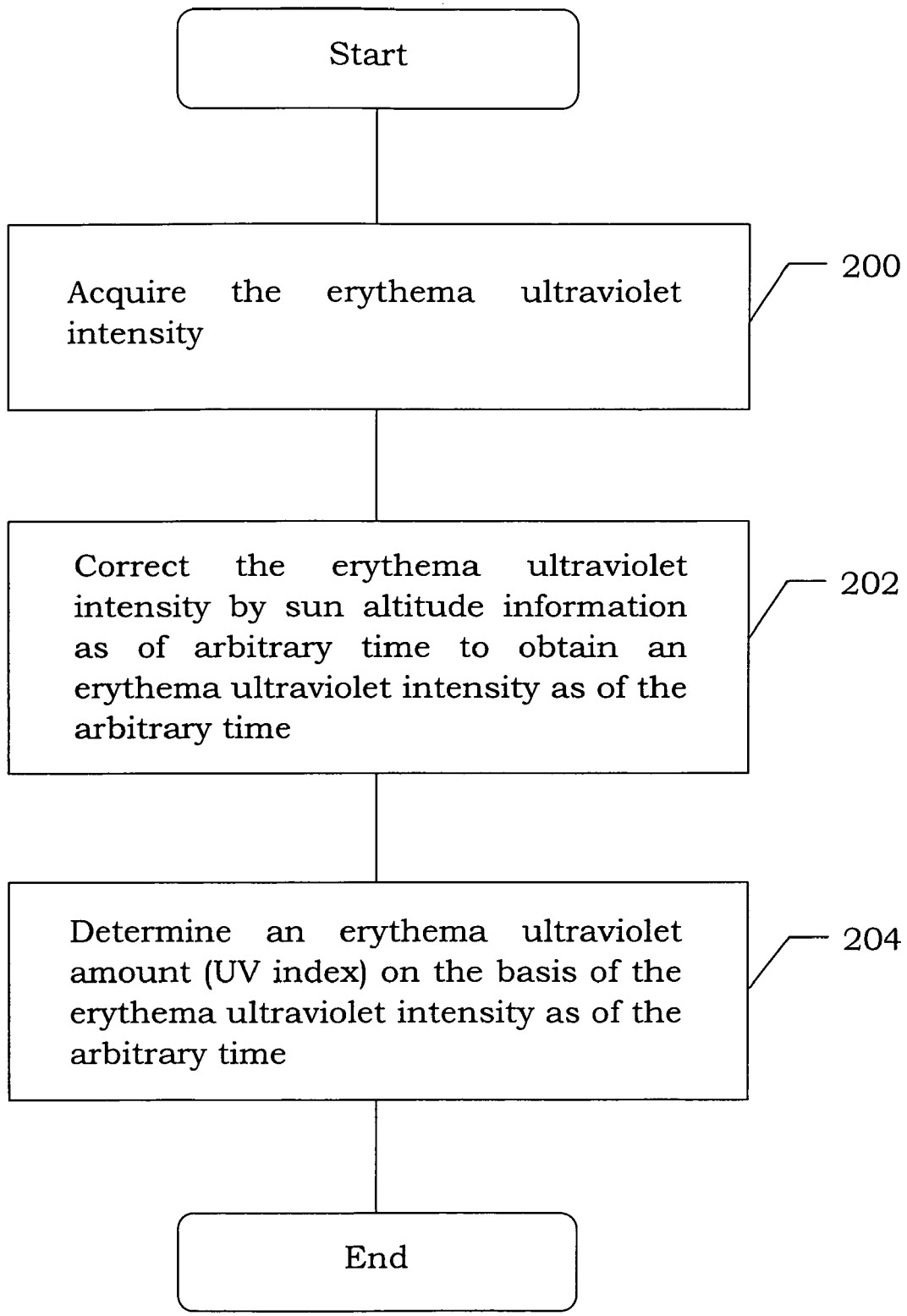
FIG. 4 is a flow chart showing another flow of ultraviolet measurement process in an ultraviolet measuring device according to another embodiment of the invention.

Moreover, at a Step 200 shown in FIG. 4, the erythema ultraviolet intensity obtained at the above-described Step 102 is retrieved from the memory 38. Then, the process proceeds to a Step 202.

At the Step 202, set values (sun altitude information for an arbitrary point in time) which have been stored in the memory 38 and are to be used in obtaining erythema ultraviolet intensity as of the arbitrary point in time are retrieved from the memory 38; the acquired erythema ultraviolet intensity is corrected according to the sun altitude information for the arbitrary point in time; the erythema ultraviolet intensity is obtained; and the acquired information is stored in an unused storage area of the measured data section in the memory 38. Then, the process proceeds to a Step 204.

At the Step 204, the information (erythema ultraviolet intensity as of the arbitrary point in time) acquired at the Step 202 and set values to be used in obtaining the erythema ultraviolet amount and the UV index from the information acquired at the Step 202 are retrieved from the memory 38; the erythema ultraviolet amount and the UV index are obtained; and the acquired information is stored in an unused storage area of the measured data section in the memory 38. Then, the process is completed.

Further, though not shown in figures, the following constitution may be applied: a PFA (Protection factor of UVA) value and a PA value are obtained from the erythema ultraviolet amount and the integrated erythema ultraviolet intensity, and the obtained values are compared with the PFA values and the PA values of the ultraviolet protective agents which have been stored in the memory 38, to determine a required ultraviolet protective agent.

The information stored in the memory 36 and the acquired information are displayed on the liquid crystal panel display 16.

The ultraviolet measurement process in the ultraviolet measuring device 10 explained above are conducted according to the ultraviolet measuring method of the invention.

This embodiment is also applicable to the method and the device using the conversion factor. In that case, the conversion formulae and set values to be used in the conversion are stored in the memory 38 and the conversion factor is used in the Step 102.

The ultraviolet measuring device 10 according to the embodiment may be integrated with a portable device (such as a clock, a cellular telephone, a portable electronic mail apparatus, a portable navigator, or a portable computer).

In this particular embodiment, the output of the ultraviolet sensitive element 18 may be a photovoltaic current flowing between electrodes, or a photoelectric current obtained by applying a voltage. However, the ultraviolet sensitive element 18 is preferably of photoelectromotive-current type since the electric power of the portable device is not consumed.

Further, in the ultraviolet measuring device 10 in this embodiment, the ultraviolet sensitive element 18 may be disposed on the backside of the window material provided on the display element of the portable device, or disposed between the window material and the display element surface. Furthermore, the ultraviolet sensitive element 18 may be disposed on a surface of the display element, or disposed on a location with a separate incidence window.

The position information is acquired with the GPS receiver 24 in the ultraviolet measuring device 10 according to the embodiment. However, the acquisition method is not limited to the above configuration. For example, the following configuration may be applied: the position information of an arbitrary location is stored in the memory 38 before the measurement, then a required piece of position information is retrieved upon specification by a user. Another example of the configuration utilizes a PHS (Personal Handy-phone System) in acquiring the position information.

It should be noted that the above-described embodiments should not be interpreted as limiting the invention to the embodiments. Therefore, various variations and modifications may be made as long as the requirements of the present invention are satisfied.

According to the invention, an ultraviolet measuring method and an ultraviolet measuring device are provided by which specific ultraviolet information can be obtained at any time from an actually measured value measured by an ultraviolet sensitive element with a specific spectral sensitivity in an easy and simple manner, and by which a total amount of ultraviolet can be measured at the same time.

Moreover, there are provided an ultraviolet measuring method and an ultraviolet measuring device by which ultraviolet information for an arbitrary point in time can be predicted.

What is claimed is:

1. An ultraviolet measuring method using an ultraviolet sensitive element, comprising:
   measuring an ultraviolet intensity within a first ultraviolet wavelength range with the ultraviolet sensitive element at a sun altitude; and
   determining an integrated ultraviolet intensity within a second ultraviolet wavelength range by converting the measured intensity to the integrated ultraviolet intensity within the second ultraviolet wavelength range by using a conversion factor corresponding to the sun altitude,
   wherein the conversion factor is a function of at least sun altitude.

2. The ultraviolet measuring method using an ultraviolet sensitive element according to claim 1, wherein the second ultraviolet wavelength range is substantially within the first ultraviolet wavelength range.

3. The ultraviolet measuring method using an ultraviolet sensitive element according to claim 1, wherein the second ultraviolet wavelength range is substantially outside of the first ultraviolet wavelength range.

4. An ultraviolet measuring method using an ultraviolet sensitive element, comprising:
   measuring an ultraviolet intensity within a first ultraviolet wavelength range with the ultraviolet sensitive element at a sun altitude; and
   determining a response index within a second ultraviolet range by converting the measured intensity to the response index by using a conversion factor corresponding to the sun altitude,
   wherein the conversion factor is a function of at least sun altitude.

5. The ultraviolet measuring method using an ultraviolet sensitive element according to claim 4, wherein the second ultraviolet wavelength range is substantially within the first ultraviolet wavelength range.

6. The ultraviolet measuring method using an ultraviolet sensitive element according to claim 4, wherein the second ultraviolet wavelength range is substantially outside of the first ultraviolet wavelength range.

7. An ultraviolet measuring method using an ultraviolet sensitive element having spectral sensitivity in a first ultraviolet wavelength range, comprising:
   measuring an integrated ultraviolet intensity within the first ultraviolet wavelength range with the ultraviolet sensitive element at a sun altitude; and
   (1) determining an integrated ultraviolet intensity within a second ultraviolet wavelength range by correcting the measured intensity on the basis of a standard intensity ratio and a sun altitude correction factor for the standard intensity ratio wherein the standard intensity ratio is a ratio between an integrated ultraviolet intensity within the second ultraviolet wavelength range and an integrated ultraviolet intensity within the first ultraviolet wavelength range, with respect to a standard solar radiation spectrum, or
   (2) determining a response index on the basis of the measured intensity, a standard intensity ratio, and a sun altitude correction factor for the standard intensity ratio wherein the standard intensity ratio is a ratio between a response index and an integrated ultraviolet intensity within the first ultraviolet wavelength range, with respect to a standard solar radiation spectrum.

8. The ultraviolet measuring method according to claim 7, wherein the sun altitude correction factor for the standard intensity ratio is determined on the basis of at least a light path length of sunlight in the earth's atmosphere.

9. The ultraviolet measuring method according to claim 7, wherein the sun altitude correction factor for the standard intensity ratio is determined on the basis of at least ozone concentration information.

10. The ultraviolet measuring method according to claim 7, wherein the response index is an index determined by using an erythema curve.

11. An ultraviolet measuring method according to claim 7, further comprising
correcting the measured ultraviolet intensity according to sun altitude information for an arbitrary point in time so as to predict an ultraviolet intensity at the point in time.

12. The ultraviolet measuring method according to claim 11, further comprising integrating the predicted ultraviolet intensity over a specified time period to predict an integrated ultraviolet intensity.

13. An ultraviolet measuring method according to claim 12, wherein a kind of ultraviolet ray protective agent is decided on the basis of the predicted integrated ultraviolet intensity.

14. An ultraviolet measuring device comprising an ultraviolet sensitive element and a conversion device, wherein the conversion device converts a value measured by the ultraviolet sensitive element within a first ultraviolet wavelength range at a sun altitude to an integrated ultraviolet intensity within a second ultraviolet wavelength range by using information of the sun altitude.

15. The ultraviolet measuring method using an ultraviolet sensitive element according to claim 14, wherein the second ultraviolet wavelength range is substantially within the first ultraviolet wavelength range.

16. The ultraviolet measuring method using an ultraviolet sensitive element according to claim 14, wherein the second ultraviolet wavelength range is substantially outside of the first ultraviolet wavelength range.

17. An ultraviolet measuring device comprising an ultraviolet sensitive element and a conversion device, wherein the conversion device converts a value measured by the ultraviolet sensitive element within a first ultraviolet wavelength range at a sun altitude to a response index within a second ultraviolet wavelength range by using information of the sun altitude.

18. The ultraviolet measuring method using an ultraviolet sensitive element according to claim 17, wherein the second ultraviolet wavelength range is substantially within the first ultraviolet wavelength range.

19. An ultraviolet measuring device comprising:
an ultraviolet sensitive element with spectral sensitivity to a first wavelength range;
a storage unit which stores a standard intensity ratio; and
a correction unit which corrects an intensity measured by the ultraviolet sensitive element on the basis of the standard intensity ratio and a sun altitude correction factor to obtain an integrated ultraviolet intensity within a second ultraviolet wavelength range or to obtain a response index,
wherein the standard intensity ratio is a ratio between an integrated ultraviolet intensity within the second ultraviolet wavelength range or a response index and an integrated ultraviolet intensity within the first ultraviolet wavelength range, with respect to a standard solar radiation spectrum.

20. The ultraviolet measuring device according to of claim 19 further comprising:
a sun altitude information acquisition unit which acquires sun altitude information to be used for determining the sun altitude correction factor for the standard intensity ratio.

21. The ultraviolet measuring device according to claim 20, wherein latitude information or longitude information, and date and time information are acquired as the sun altitude information.

22. The ultraviolet measuring device according to claim 20, wherein latitude information, longitude information, and date and time information are acquired as the sun altitude information.

23. The ultraviolet measuring device according to claim 19, wherein the response index is an index determined by using an erythema curve.

24. An ultraviolet measuring device according to claim 19, wherein
the storage unit further stores sun altitude information for arbitrary points in time; and
the correction unit further corrects the intensity measured by the ultraviolet sensitive element according to sun altitude information for an arbitrary point in time so as to predict an ultraviolet intensity at the point in time.

25. The ultraviolet measuring device according to claim 24, further comprising
a calculation unit which calculates an integrated ultraviolet intensity over a specified period.

26. The ultraviolet measuring device according to claim 25, further comprising a decision unit which decides the kind of ultraviolet ray protective agent on the basis of the predicted integrated ultraviolet intensity.

* * * * *